(12) United States Patent
Satheesh Kumar et al.

(10) Patent No.: US 12,028,720 B2
(45) Date of Patent: Jul. 2, 2024

(54) METHOD AND NODE FOR HANDLING SENSOR NODES AND FOG NODES IN A COMMUNICATIONS SYSTEM

(71) Applicant: Telefonaktiebolaget LM Ericsson (publ), Stockholm (SE)

(72) Inventors: Perepu Satheesh Kumar, Chennai (IN); Saravanan Mohan, Chennai (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 442 days.

(21) Appl. No.: 17/294,631

(22) PCT Filed: Nov. 19, 2018

(86) PCT No.: PCT/IN2018/050763
§ 371 (c)(1),
(2) Date: May 17, 2021

(87) PCT Pub. No.: WO2020/105059
PCT Pub. Date: May 28, 2020

(65) Prior Publication Data
US 2022/0014932 A1   Jan. 13, 2022

(51) Int. Cl.
*H04W 16/18* (2009.01)
*H04W 4/38* (2018.01)
(Continued)

(52) U.S. Cl.
CPC ............ *H04W 16/18* (2013.01); *H04W 4/38* (2018.02); *H04W 24/08* (2013.01); *H04W 24/10* (2013.01); *H04W 84/18* (2013.01)

(58) Field of Classification Search
CPC ...... H04L 41/145; H04L 67/10; H04W 16/18; H04W 4/38; H04W 24/08; H04W 24/10; H04W 84/18; H04W 24/02; H04W 4/70
See application file for complete search history.

(56) References Cited

U.S. PATENT DOCUMENTS

| 2018/0109428 A1* | 4/2018 | Kattepur | ................. H04W 4/70 |
| 2018/0316555 A1* | 11/2018 | Salgueiro | ................. H04L 67/34 |

FOREIGN PATENT DOCUMENTS

| CN | 106845538 A | 6/2017 |
| CN | 107249169 A | 10/2017 |

(Continued)

OTHER PUBLICATIONS

International Search Report and Written Opinion of the International Searching Authority, PCT/IN2018/050763, dated Mar. 4, 2019, 11 pages.

(Continued)

*Primary Examiner* — Rina C Pancholi
(74) *Attorney, Agent, or Firm* — Sage Patent Group

(57) ABSTRACT

The embodiments herein relate to a method performed by a cloud node. The cloud node obtains measurements from at least some of the sensor nodes. The cloud node mathematically determines a minimum number of sensor nodes and their optimal locations. Based on the obtained measurements and the mathematically determined optimal locations, the cloud node graphically determines an optimal location for each of the minimum number of sensor nodes. The cloud node compares the mathematically and the graphically determined optimal locations. When the comparison indicates that the mathematically and graphically determined optimal locations are the same, the cloud node determines a minimum number of fog nodes. Based on the optimal location of sensor nodes, the cloud node determines an optimal location for each of the minimum number of fog nodes.

19 Claims, 7 Drawing Sheets

(51) Int. Cl.
*H04W 24/08* (2009.01)
*H04W 24/10* (2009.01)
*H04W 84/18* (2009.01)

(56) References Cited

FOREIGN PATENT DOCUMENTS

| CN | 108243245 A | 7/2018 |
|---|---|---|
| IN | 201621035796 A | 10/2016 |
| WO | WO 2017127743 A1 | 7/2017 |

OTHER PUBLICATIONS

Haider, Faisal et al., "On the Planning and Design Problem of Fog Computing Networks", IEEE Transactions on Cloud Computing, XP055710850, Oct. 8, 2018, 14 pages.

Duan, Chao et al., "Facts Devices Allocation via Sparse Optimization", IEEE, 12 pages.

Guo, Ping et al., "Optimal Deployment and Dimensioning of Fog Computing Supported Vehicular Network", IEEE Trustcom-BigDataSE-ISPA, XP033063576, Aug. 23, 2016, pp. 2058-2062 (5 pages).

Wu, Xiaopei, et al., "In-Situ Soil Moisture Sensing: Optimal Sensor Placement and Field Estimation", ACM Transactions on Sensor Networks, Jan. 2011, 30 pages.

Krause, Andreas et al. "Near-Optimal Sensor Placements: Maximizing Information while Minimizing Communication Cost", IEEE Xplore, 9 pages.

Smeraldi, F. et al., "Cloosting: Clustering Data with Boosting", Springer-Verlag, Berlin, Heidelberg, 2011, 10 pages.

"DaISy (Database for the Identification of Systems)", STADIUS, 2 pages.

Liu, Quan et al., "Probabilistic Reasoning via Deep Learning: Neural Association Models", arXiv preprint arXiv:1603.07704, 2016, 7 pages.

Peng, Mugen et al., Fog Computing based Radio Access Networks: Issues and Challenges, IEEE, Jun. 13, 2015, 21 pages.

Lazrag et al.; "Bi-Objective GA for Cost-effective and Delay-aware Gateway Placement in Wireless Mesh Networks" 2017 IEEE/ACS 14th International Conference on Computer Systems and Applications; Oct. 30-Nov. 3, 2017; pp. 103-108 (6 pages).

Gravalos et al.; Efficient Network Planning for Internet of Things With QoS Constraints; IEEE Internet of Things Journal, vol. 5, No. 5; Oct. 2018, pp. 3823-3836 (14 pages).

Office Action dated Mar. 22, 2024 for Chinese Patent Application No. 201880099476.1, 13 pages (includes English translation).

\* cited by examiner

METHOD AND NODE FOR HANDLING SENSOR NODES AND FOG NODES IN A COMMUNICATIONS SYSTEM

CROSS REFERENCE TO RELATED APPLICATION

This application is a 35 U.S.C. § 371 national stage application of PCT International Application No. PCT/IN2018/050763 filed on Nov. 19, 2018, the disclosure and content of which is incorporated by reference herein in its entirety.

TECHNICAL FIELD

Embodiments herein relate generally to a cloud node and a method performed by the cloud node. More particularly the embodiments herein relate to handling sensors nodes and fog nodes in a communications system.

BACKGROUND

Internet of Things (IoT) has and will continue to grow fast in the coming years. There are many different definitions of IoT, and one of them provided by the IEEE in "Towards a definition of the Internet of Things (IoT)", Revision 1, 27 May 2015 is as follows:

"An IoT is a network that connects uniquely identifiable "Things" to the Internet. The "Things" have sensing/actuation and potential programmability capabilities. Through the exploitation of unique identification and sensing, information about the "Thing" can be collected and the state of the "Thing" can be changed from anywhere, anytime, by anything".

The current cellular infrastructure has challenges related to dealing with the increasing IoT traffic. A customized design for IoT applications for a Fog Random Access Network (RAN), e.g. one type of fog node, requires heterogeneous communication, real-time computation, local storage and application specific functionalities. The benefits are expected to be reduced latency, increased throughput, leverage and locality and finally relieving backhaul load. In the Fifth Generation (5G) era, new business models are expected to be introduced in the telecommunication operators circle. The operators will collaborate with application/service providers to provide better quality of IoT services. Adding more and more nodes for IoT networking for new 5G applications will create maintenance issues in future. One of the problems with the current technology is to analyse and explore the services only with the presence of minimal nodes.

Digital innovation from IoT, Artificial Intelligence (AI), Virtual Reality (VR), Tactile Internet and 5G applications is creating a new paradigm for the society to work, commute, shop, assisted living and play in a fast and optimal way. 5G is the foundation for the digitalization of industries and society. Data from newly connected industrial IoT scenarios are expected to increase from 1.1 zettabytes or 89 exabytes per year in 2016 to 2.3 zettabytes or 194 exabytes per year by 2020. Current "cloud-only" architectures cannot keep up with the volume and velocity of this data across the network, thereby reducing the value that may be created and captured from these investments. Together, the proliferation of cloud and IoT technologies enables small-scale and large-scale smart environments and systems for various domains, such as smart healthcare, smart cities, smart energy grids, or smart factories. However, from a technological point of view, the decentralized nature of the IoT does not match the rather centralized structure of the cloud. Today, IoT data are mostly produced in a distributed way, sent to a centralized cloud for processing, and then delivered to the distributed stakeholders or other distributed IoT devices, often located close to the initial data sources. This centralized processing approach results in large communication delays and low data transfer rates between IoT devices as well as the IoT devices and their potential users.

Fog computing is a concept which aims at bringing cloud service features closer to what is referred to as "Things," comprising sensors, embedded systems, mobile phones, vehicles, etc. The metaphor fog comes from the meteorological term for a cloud close to the ground, just as fog concentrates on the edge of the network. Fog computing is a complement to cloud computing, where the cloud moves down, "closer to the ground", to the end systems, the machines, the sensors and actuators that produce the data, i.e. the "Things". Fog computing may also be referred to as fog networking or fogging. The OpenFog consortium defines fog computing (https://www.openfogconsortium.org/what-we-do#definition-of-fog-computing) as follows:

"Fog computing is a system-level horizontal architecture that distributes resources and services of computing, storage, control and networking anywhere along the continuum from Cloud to Things. It is a:

Horizontal architecture: Support multiple industry verticals and application domains, delivering intelligence and services to users and business Cloud-to-Thing continuum of services: Enable services and applications to be distributed closer to Things, and anywhere along the continuum between Cloud and Things System-level: Extend from the Things, over the network edges, through the Cloud, and across multiple protocol layers—not just radio systems, not just a specific protocol layer, not just at one part of an end-to-end system, but a system spanning between the Things and the Cloud".

A fog node is a physical device where fog computing is deployed. A fog node performs functions that might be performed at a server in cloud computing. Examples of functions that a fog node performs may be storage, communication, compute, control, decision making etc. The fog node may be deployed anywhere with a network connection: on a factory floor, on top of a power pole, alongside a railway track, in a vehicle, on an oil rig etc. Any device with computing, storage, and network connectivity may be a fog node. With fog computing, the data processing takes place in a fog node, thus reducing the amount of data sent to the cloud.

A fog node is a device that intelligently handles any situation by performing fog computing. Since multiple devices are involved, it is complex to find and place the optimum number of fog nodes in any smart application. The concept of placing fog nodes in an industrial scenario is different with WiFi routers and sensors where only signal strength between two objects should be measured. But, it is necessary to measure various relevant correlated parameters of the devices connected to a fog node. Moreover, in the fog computing scenario, the inherent characteristics like a) Low latency and location awareness; b) Wide-spread geographical distribution; c) Mobility; d) Very large number of nodes in close proximity, e) Predominant role of wireless access, f) Strong presence of streaming and real time applications, g) Heterogeneity, will complicate the challenges of finding the minimum number of fog nodes needed to accommodate the network. Also, some of the fog nodes are acting independently. Currently, there are no solutions for finding the minimal number of fog nodes and their location in any allotted area.

Fog computing provides the ability to create Device-to-Device (D2D) communications paths without disrupting existing edge-to-cloud communications. Data stored in fog nodes may also be uploaded to the appropriate cloud or to multiple clouds to bridge silos. Fog computing provides a missing link in the cloud-to-thing continuum. Fog architectures selectively move computation, storage, communication, control, and decision making closer to the network edge where data is being generated in order to solve the limitations in the current infrastructure to enable mission-critical, data-dense use cases.

An optimal placement of fog nodes is similar to that of optimal sensor placement where the sensors are replaced with a set of sensors in a fog node. There are techniques for optimal sensor placement using clustering where the number of sensors is required. However, with the technique for optimal sensor placement, it is necessary to have an idea on the number of sensors to be placed. In addition, the characteristics of the fog node are different from that of general sensors because fog nodes are combination of the sensors, which makes the optimal sensor placement techniques unavailable for fog nodes.

There are some current solutions for optimal placement of fog nodes. However, these solutions also require the specification of the minimum number of sensors which is difficult to obtain in practice. Also, these solutions do not scale up for large systems since the optimization problem which they solve is not scalable. In another solution, an optimal fog node placement uses a graph based approach. However, the current graph based approach is not scalable and also cannot differentiate the characteristics of sensors connected to the fog nodes.

In general, it is assumed that all the fog nodes are independently working with each other. In some cases, the fog nodes share computation by which one fog node may affect other fog nodes. In these situations, it is advantageous to build a graph based on the network using traditional methods to understand the connectivity of the network. Current techniques for graph construction are based on correlation, which considers only linear dependencies.

Edge computing is another concept which is often mentioned together with IoT. Both edge computing and fog computing relates to distributing processing capabilities down closer to where the data originate. One difference between the edge computing and the fog computing is where the processing capabilities are located. Edge computing usually occurs directly on the devices to which the sensors are attached or a gateway device that is physically close to the sensors Fog computing, on the other hand, distributes the processing capabilities to processors that are connected to the Local Area Network (LAN) or into the LAN hardware itself. With fog computing, the data is processed within a fog node which is situated within the LAN. With edge computing, the data is processed on the device or sensor itself without being transferred anywhere, i.e. the data and processing is kept on the device that initially created it. Edge computing may be seen as a technique predates the fog computing.

Many recent research studies explores the cellular infrastructure especially 5G networks that is LTE-A for developing fog computing in different applications. One use of LTE-A network for high speed communication purpose is for the signal processing activities through Fog Radio Access Networks. One recent study proposes a RAN architecture for 5G systems based on fog computing which is an effective extension of cloud based RAN. It is used to reduce the front haul load and delay with the help of using virtualized baseband processing units. The edge processing and virtualization are efficient aspects in the context of 5G networks. Recently fog based catching at the edge devices in a radio access network has been explored and used to identify the optimal catching along with front haul and edge transmission policies. Moreover, 5G systems need more latency-sensitivity than the 4G systems. Fog computing is being applied in 5G systems to minimize the delay which comprises communication and computing delay. Another issue to be addressed in using fog computing for 5G applications is the load balancing. It is able to provide low latency interactions between machine to machine communications. Hence it can be noted that the 5G based cellular system and the fog computing framework are very much related to each other in terms of compatibility compare to cloud computing.

Therefore, there is a need to at least mitigate or solve the above issues.

SUMMARY

An objective of embodiments herein is therefore to obviate at least one of the above disadvantages and to provide an improved communications system.

According to a first aspect, the object is achieved by a method performed by a cloud node for handling sensors nodes and fog nodes in a communications system. The communication system comprises a plurality of sensor nodes located at a plurality of locations to be handled by the fog nodes. The cloud node obtains measurements from at least some of the plurality of sensor nodes at at least some of the plurality of locations. Based on the obtained measurements, the cloud node mathematically determines a minimum number of sensor nodes and their respective optimal locations required to monitor the whole communication system. Based on the obtained measurements and the mathematically determined optimal locations, the cloud node graphically determines an optimal location for each of the minimum number of sensor nodes required to monitor the whole communication system. The cloud node compares the mathematically determined optimal locations with the graphically determined optimal locations. When the comparison indicates that the mathematically and graphically determined optimal locations are at least substantially the same, the cloud node determines a minimum number of fog nodes to cover the minimum number of sensor nodes. Based on the optimal location of sensor nodes, the cloud node determines an optimal location for each of the minimum number of fog nodes.

According to a second aspect, the object is achieved by a cloud node in a communication system. The communication system comprises a plurality of sensor nodes located at a plurality of locations to be handled by fog nodes. The cloud node is adapted to obtain measurements from at least some of the plurality of sensor nodes at at least some of the plurality of locations. The cloud node is adapted to, based on the obtained measurements, mathematically determine a minimum number of sensor nodes and their respective optimal locations required to monitor the whole communication system. The cloud node is adapted to, based on the obtained measurements and the mathematically determined optimal locations, graphically determine an optimal location for each of the minimum number of sensor nodes required to monitor the whole communication system. The cloud node is adapted to compare the mathematically determined optimal locations with the graphically determined optimal locations. The cloud node is adapted to, when the comparison indicates that the mathematically and graphically determined optimal locations are at least substantially the same, determine a minimum number of fog nodes to cover the minimum number of sensor nodes. The cloud node is adapted to, based on the optimal location of sensor nodes, determine an optimal location for each of the minimum number of fog nodes.

Thanks to the mathematical and graphical determination of the minimum sensor number and optimal sensor location, and also the minimum fog node number and the optimum fog node location, an improved communication is provided in which redundant sensors nodes and/or fog nodes can be deleted or avoided so that the maintenance costs can be reduced and remaining sensors and bandwidth can be used for other applications.

Embodiments herein afford many advantages, of which a non-exhaustive list of examples follows:

An advantage of the embodiments herein is that they may be used effectively to optimally place fog nodes handles multiple sensor nodes and communication devices and it may be expected to implement in many indoor environments for different purposes.

Another advantage of the embodiments herein is that they may reduce the latency in acquiring of the data to process it, which is an important factor in communications systems.

Furthermore, an advantage of the embodiments herein is that they may provide dynamics to the applications where it may compute the optimal locations in a specific time interval to recomputed the best locations and move the sensor nodes to the new locations.

Another advantage of the embodiments herein is that they may be endeavored in existing fog network setups to reduce the number of fog nodes and optimize the placement and cost of them.

A further advantage of the embodiments herein is that they are easily scalable and also the delivers the required minimal number of fog nodes and their placement in any new applications.

Another advantage of the embodiments herein is that the fog nodes expedites the eNode support to mobile phones and improve the QoS in the communications system.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail by way of example only in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1:
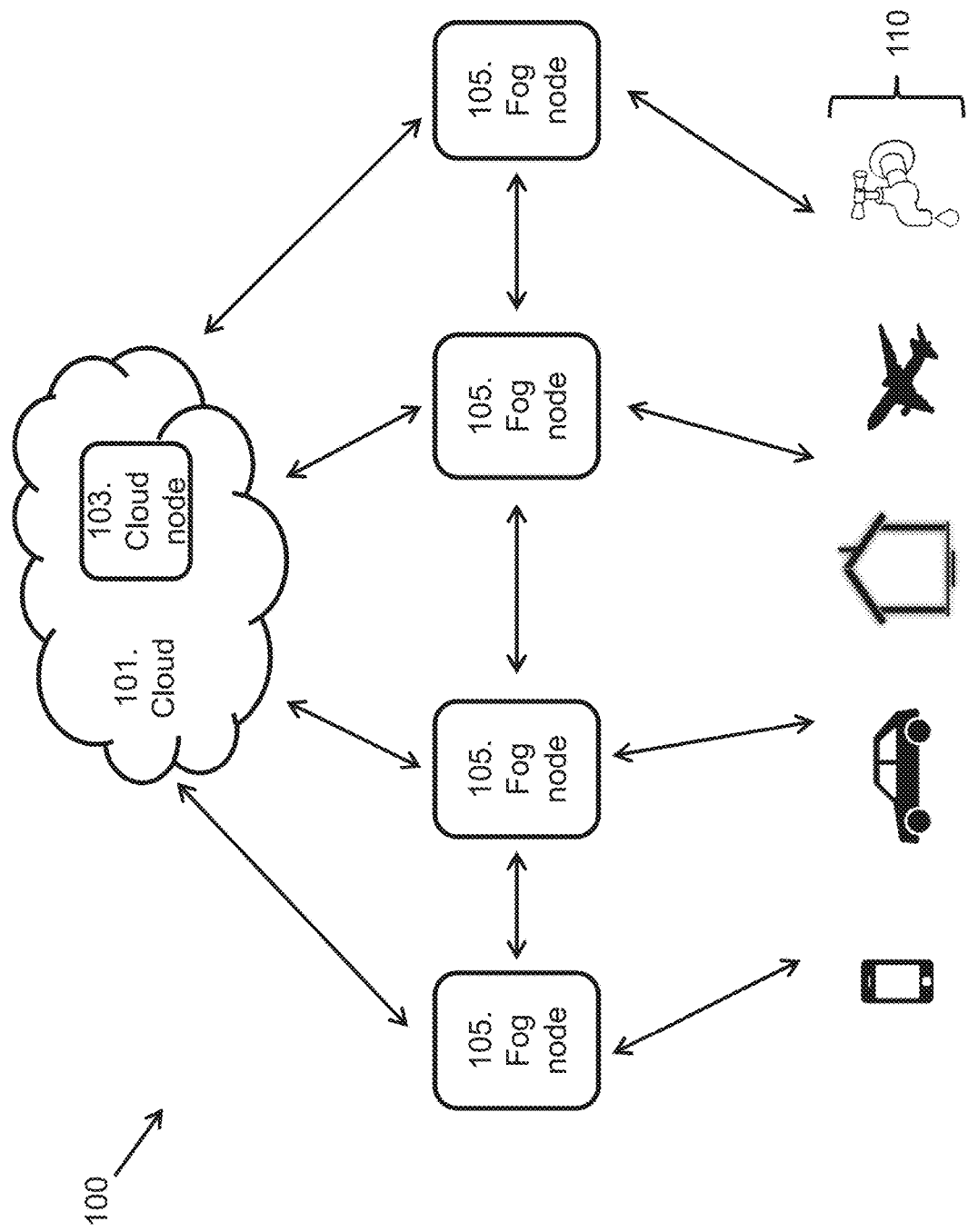
FIG. 1 is a schematic block diagram illustrating embodiments of a communication system.

FIG. 1 depicts a communications system 100 in which embodiments herein may be implemented. The communications network 100 may in some embodiments apply to one or more communications technologies such as for example Second Generation (2G), Third Generation (3G), Fourth Generation (4G), Fifth Generation (5G) or any other Third Generation Partnership Project (3GPP) radio access technology, or other access technologies such as e.g. Wireless Local Area Network (WLAN).

The communication system 100 comprises a cloud 101. The cloud 101 comprises at least one cloud node 103. The cloud 101 may be described as an infrastructure providing computing services, servers, storage, databases, networking, software, etc., over the Internet ("the cloud") to offer faster innovation, flexible resources and economies of scale. A cloud may be a private, public or hybrid cloud. FIG. 1 illustrates one cloud node 101, but it should be noted that the cloud 100 may comprise n number of cloud nodes 101, where n is a positive integer. The cloud 101 may also be referred to as a data center.

One, two or more fog nodes 105 may be adapted to communicate with the cloud node 103. In case of two or more fog nodes 105, then they are adapted to communicate with each other. As mentioned earlier, a fog node 105 is a device adapted to process, analyze and store data. The data processing done by the fog node 105 may also be referred to as pre-processing, and then the data processing performed by the cloud node 103 may be referred to as main processing. A fog node 105 may be comprised in a router, gateway, an IoT gateway etc. Using other words, some of the functions ordinarily performed by the cloud 101 are distributed to the fog node 105 when fog computing is deployed in the communications system 100.

A fog node 105 has a certain geographically coverage area within which it may handle one, two or more sensor nodes 110. A sensor node 110 may be handled by one or more fog nodes 105. The fog node 105 is geographically located closer to the sensor nodes 110 compared to the centralized cloud 101, i.e. it is located closer to the data producing sensor nodes 110. The fog node 105 may also be seen as being located between the cloud 101 and the sensor nodes 110.

The communications system 100 may comprise any number of sensor nodes 110. A sensor node 110 produces data. Some examples of sensor nodes 110 may be a mobile phone, a vehicle, a video surveillance camera in a home, an airplane, a water sensor etc. The sensor nodes 110 may also be referred to as "Things" in relation to IoT, endpoints, endpoint devices, edge devices, IoT devices. The sensor nodes 110 are adapted to provide data to the fog nodes 105 upon generation, upon request, upon regular basis etc. the sensor nodes 110 may be adapted to communicate with each other. A sensor node 110 may be of a sensor type, and there may be one, two or more sensor types comprised in the communications system 100. For example, the communications system 100 may comprise two temperature sensors, one vehicle sensor and three water sensors.

The fog nodes 105 may be described as smart nodes in that they perform processing and the sensor nodes 110 may be described as dumb nodes as they only produce data.

The communications system 100 may also be described as comprising three layers: a cloud layer, a first fog layer and a second fog layer. The cloud layer comprises the cloud 101 comprising the cloud node 103, the first fog layer comprises the fog nodes 105 and the second fog layer comprises the sensor nodes 110. Note that there may be intermediate layers between them which are not shown in FIG. 1, and that there may be additional nodes in the communications system 100 in addition to the ones which are exemplified in FIG. 1.

It should be noted that the communication links in the communications system 100 may be of any suitable kind comprising either a wired or wireless link. The communication links may use any suitable protocol depending on type and level of layer, e.g. as indicated by the Open Systems Interconnection (OSI) model, as understood by the person skilled in the art.

The embodiments herein relates to optimally placing fog nodes in a given area. The embodiments herein comprise two steps:

(I) They use both deep learning, i.e. mathematical computing, and graph creation to find and optimally place minimum number of different types of sensor nodes 1110 to monitor a given location.

(II) Further, the embodiments herein places minimum number and optimally placement of fog nodes based on location demand to setup communication between the sensors and also perform required intelligent computation and relevant communication.

The embodiments herein assume that all sensor nodes 110 and fog nodes 103 are placed in a given environment, and that one objective is to delete the redundant sensors nodes 110 and/or fog nodes 105 so that the maintenance costs may be reduced and remaining sensor nodes 110 and bandwidth may be used for other applications. This may result in large economic savings when dealing with a large number of sensor nodes 110 and fog nodes 105 in a smart city and industrial IoT scenario in future. The embodiments herein may be adapted to learn the parameter values of different devices and its associations on fog networking as a cumulative assessment strategy to cover the allotted area. In addition, a deep learning technique may be combined with an arbitrary graph generation for the minimally placement of fog nodes 105 in any area by measuring the relevant aspects of multiple sensor nodes 110 handled by a fog node 105 and its correlations.

Figure 2:
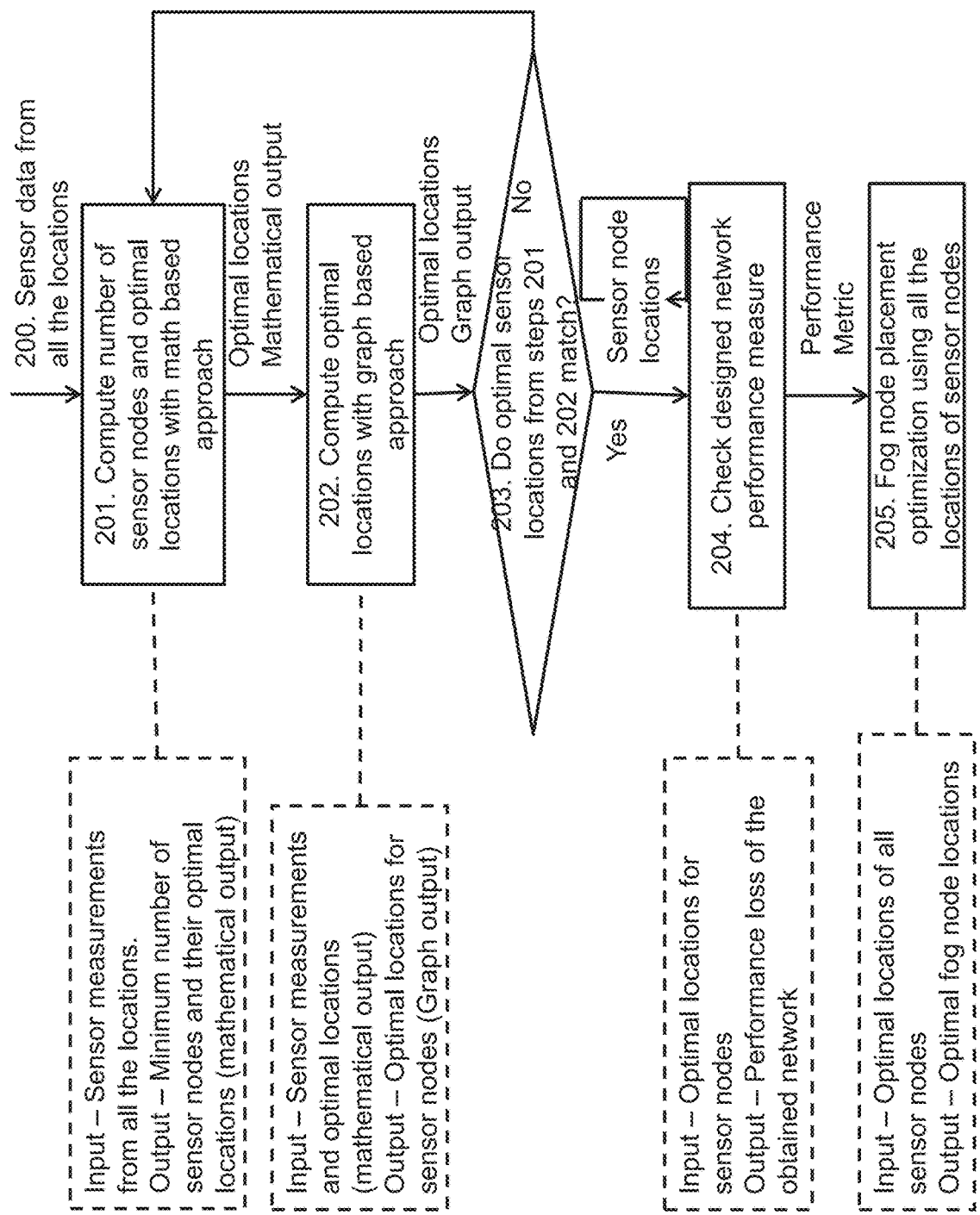
FIG. 2 is a flow chart illustrating an example method.

FIG. 2 is a flow chart illustrating a method in view of the communications system illustrated in FIG. 1. The method comprises at least one of the following steps, which steps may be performed in any suitable order than described below:

Step 200

At least some or substantially all sensor nodes 110 in the communications system 100 provide sensor data to the fog node 105. The fog node 105 obtains the sensor data form the sensor nodes 110. This may also be described as the fog node 105 obtains sensor data from sensor nodes 110 at at least some or substantially all locations comprised in the communications system 100. The sensor data may also be referred to as measurements, information etc.

Sensor data may be for example temperature measurements from a temperature sensor 110, a power measurement from a video surveillance camera etc. The sensor data may be for one time instance, they may be for a time period, they may be for several time periods etc.

The fog node 105 may provide the sensor data to the cloud node 103. This may also be referred to as the sensor nodes 110 providing sensor data to the cloud node 103 via the fog node 105. It may also be possible that the sensor nodes 110 provide sensor data directly to the cloud node 103 without going via the fog node 105.

Step 201

The cloud node 103 computes a minimum number of sensor nodes 110 and their respective locations using a mathematic based approach. The input to step 201 on which basis the cloud node 103 performs the computation is the sensor measurements from all the locations in step 200. The output from step 201 is a minimum number of sensor nodes 110 and their locations. The output may be seen as a mathematical output.

Step 202

Based on the sensor data from step 200 and the mathematically computed sensor node locations, the cloud node 103 computes the sensor node locations using a graph based approach. With steps 201 and 202, mathematically computed locations and graphically computed locations are computed for each of the sensor nodes 110 in the minimum number. The mathematically computed locations may be referred to as first locations and the graphically computed locations may be referred to as second locations. The input to step 202 are sensor measurements from step 200 and the mathematically computed locations, i.e. the mathematical output form step 201. The output from step 202 is graphically computed locations for sensor nodes 110, i.e. a graph output.

Step 203

The cloud node 103 compares the mathematically computed optimal locations from step 201 with the graphically computed locations from step 202 in order to determine if they match, i.e. if they are substantially the same.

If the optimal sensor locations from step 201 and 202 does not match, indicated with "no" in FIG. 2, the fog node 105 goes back to step 201, and performs steps 201-203 at least one more time (with different sensor data). Steps 201-203 are iterated until the locations match. If the sensor locations from step 201 and 202 match, indicated with "yes" in FIG. 2, then the method proceeds to step 204.

Step 204

This step is performed if step 203 indicates that the optimal locations match, indicated with "yes" in FIG. 2. Matching locations means that the locations are at least substantially the same, i.e. that there is some tolerance in the matching. Then the locations match, the cloud node 103 checks a designed network performance measure from step 203. The input to step 204 is the locations of the minimum number of sensor nodes 110. The output of step 204 is a performance matrix indicating performance loss of the obtained network. The obtained network comprises the minimum number of sensor nodes 110 at their optimal locations.

Step 205

The cloud node 103 performs a placement optimization using at least the optimal locations of sensor nodes 110 from step 202. The output of step 205 is the optimal fog node location. Steps 204 and 205 may be run in parallel or non-parallel.

The steps 201, 202 and 203 are repeated for each different type of sensor node 110 since each and every area is monitored with different types of sensor nodes 110.

Steps 201, 202 and 203 in FIG. 2 will now be described in more detail, which are related to the minimum number of sensor nodes 110 and their optimal location:

Step 201

This step is performed by the cloud node 103. Let the number of candidate sensor node locations to be monitored be N and the minimum number of sensor nodes 110 to be placed be M (M<<N), where N and M are positive integers. Then, M and the optimal sensor node locations satisfying the constraints are estimated.

Mathematically, the vector y is obtained as:

$$y=Ax$$

where $y \in \mathbb{R}^N$ is the vector of the values obtained at the N candidate locations, $x \in \mathbb{R}^N$ is the values of sensor nodes 110 measured at all N candidate locations and A is the matrix relating the y and x. If the devices comprising the sensor nodes 110 are placed at all N candidate locations, A will be identity matrix.

Then, a lower-dimensional approximation of x is estimated such that the elements of y are non-zero, i.e. all the N candidate locations are monitored, in the case of device placement, or the elements of y are greater than a threshold, i.e. the intensity of the Wi-Fi signal is greater than the threshold, in the case the sensor nodes 110 are comprised in e.g. Wi-Fi routers. The lower-dimensional approximation is as low as possible. It should be noted that if the lower-dimensional approximation of x, let it be $\hat{x}$, is estimated, then the matrix A signifies the relation between y and $\hat{x}$. The relation between y and $\hat{x}$ can be obtained in two ways.

The threshold mentioned above is a generative threshold and depends on the application. For example, the threshold can be 0.8, e.g. a ratio of Wi-Fi signal at the current location to maximum wi-fi signal at another location.

If historical data is available, a Principal Component Analysis (PCA) approach may be used to estimate A. PCA is a statistical method for finding the principal component of data, and is used to emphasize variation and bring out strong patterns in data, and is often used to make data easy to explore and visualize. When estimating the matrix A the candidate sensor node locations in $\hat{x}$ may be assumed to be independent from each other and the remaining locations in y may be assumed to be dependent variables. The process of using PCA to estimate the matrix A is shown below:

First the PCA for the given data is obtained. Next, following equation is obtained:

$$U, \text{Sigma}, VT = SV\ D(\text{data})$$

where

Data is an m×n matrix which represents the readings across all sensor nodes 110 sampled at fixed intervals.
U is a m×m matrix
Sigma is an n×n diagonal matrix
VT is an n×n matrix Note that, m refers to the number of timestamped instances when the readings of the sensor nodes 110 were noted, n refers to the number of sensor nodes 110 being considered across which information is gathered.

The process of constructing the A matrix may be as follows:

The zero Eigen values in the sigma matrix and the corresponding Eigen vectors in the VT matrix are obtained in order generate relations between the various sensor nodes 110. Recall that the sigma matrix is a diagonal matrix. Assume that the subset of sensor measurements is connected to the entire measurements as follows:

$$y=Ax$$

where $y \in R^M$ is the entire vector of measurements, $y \in R^N$ is the subset vector of measurements (M>>N), A is the matrix which may be derived from the historical measurements based on PCA. In PCA, a general matrix A is factorized as $$A = U\Sigma V^T$$

where $\Sigma$ is the diagonal matrix of singular values of the matrix A arranged in descending order. Since the relationships between the columns in the matrix A are to be obtained, only the principle components corresponding to the zero values in the matrix $\Sigma$ are considered. Assume that there is K such zero values. By the way of linear algebra, the following may be represented:

$$\overline{V}y=0$$

where $\overline{V}$ is the matrix of Eigen vectors corresponding to zero singular values in $\Sigma$ and y is a vector of all the M locations. After this, the vector y is divided into the independent variables $y_1$ and dependent variables $y_2$. By this factorization, the relation between dependent and independent variables may be obtained as follows:

$$V_1 y_1 + V_2 y_2 = 0 \Rightarrow y_2 = V_2^{-1} V_1 y_1$$

By using the above equation, the relation given in y=Ax is derived as follows:

$$y_2 = V_2^{-1} V_1 y_1 \Rightarrow y = Ax$$

Once the relation given in y=Ax is obtained, the information of this combination is calculated. The information used herein is Fisher's information which is calculated as follows:

$$I = \det(A^T A) = \det(V_2^{-1} V_1^T V_1 V_2^{-1})$$

It should be remembered that the independent variables correspond to a subset of the optimal sensor node locations, where the dependent variables correspond to the remaining locations where the values have to be inferred. Hence, for each combination of independent variables, different A matrices will be encounter.

Once the matrix A is constructed, the following optimization problem is solved to obtain the minimum number of sensor nodes 110 along with the optimal number of locations where the sensor nodes 110 should be located:

$$\hat{x} = \min_x \|y - Ax\|_2^2 + \|x\|_1 \text{ subject to elements of } y > 0$$

The first term in the objective function above ensures the estimated approximation error to be as small as possible. The second term in the above equation ensures to obtain sparse x i.e. it comprises many zeros as possible. The constraints ensure that the sensor nodes 110 may interpret the sensor node measurement i.e. the entire network comprising all sensor nodes 110 becomes observable. The vector x comprises multiple zeros and non-zeros. The indices of non-zero elements vector x correspond to the locations where the sensor nodes 110 are placed and the number of non-zero elements vector x represent the minimum number of sensor nodes 110 to place.

It should be noted that the embodiments herein are not related to a generalized optimization problem as the vector A is not fixed since it is dependent on the decision variable x. Hence, the problem is solved iteratively until all the constraints of y>0 are met. The minimization problem may be solved as follows:

i. Collect the data y. For a random A, solve the minimization problem to estimate x.
ii. For the estimated x, compute the vector y from the estimated A.
iii. Repeat steps i-ii until convergence.

The vector x gives the information of the minimum number of sensor nodes 110 required to monitor the given location such that the entire network is observable. Although this result is obtained by solving an optimization problem, this cannot be trusted entirely, since it does not consider the real time scenario.

Also, this approach needs the following two inputs (i) An amount of variance to be covered in PCA, this value will decide the number of principal components required, and (ii) the tolerance error value in the sparse optimization technique.

Step 202

This step is performed by the cloud node 103. At the end of step 201, the information on the minimum number of sensor nodes 110 to be placed along with their respective location placement is obtained. However, this is computed mathematically in step 201, and the final result obtained in step 201 may not ensure that the complete network is observable since every sensor node 110 have constrains such as e.g. wireless coverage etc. Hence, to overcome at least some of these constraints, the process of graph construction may be used in step 202.

First, the graph of all the candidate locations to be monitored may be constructed. The graph here means the adjacency matrix. The locations themselves represent the sensor nodes 110 in the graph with no connections between them i.e. no edges. Then, the first non-zero value in vector x is obtained and a sensor node 110 is placed in the location where the element of x is non-zero. Next, the edges between the sensor nodes 110 are determined based on the elements from the matrix A, since the matrix comprises information on how the sensor nodes 110 relate to each other.

Step 203

This step is performed by the cloud node 103. As mentioned earlier, step 203 relates to comparing the mathematically determined location from step 201 with the graphically determined location from step 202 in order to determine if the match or not.

The conditional probability may be used to compute the probability of placing additional sensor nodes 110 at other locations given that one sensor node 110 is already placed at a first non-zero location in x. There is a difference between the general conditional probability calculation and the conditional probability calculation used herein. The conditional probability calculation which is used herein refers to calculation of percentage of association, which is derived by calculating the conditional probability. The method uses a neural network architecture known as Neural Association Model (NAM) to compute the association. The association refers to placing of association level between presences of sensor nodes 110 at two locations. If the association is high, then it may be concluded that the sensor node 110 may, with high probability, be placed at a location, given that the sensor node 110 is available at the assumed location and vice-versa. Association values will be between 0 and 1. If the value is closer to 1, the sensor nodes 110 are said to be highly related. Whereas the value is closer to zero, the sensor nodes 110 are said to not related. The loss function used for constructing the graph and used in NAM is $$L(\theta) = \sum_{x_n^+ \in D^+} \ln f(x_n^+; \theta) + \sum_{x_n^- \in D^-} \ln(1 - f(x_n^-; \theta))$$

In the above equation, the $D^+$ and $D^-$ refers to samples which are belong to a conditioned location where the sensor node 110 is already placed and a probable location where the sensor node 110 is to be moved. In addition, the function $f(\cdot)$ refers to a logistic score function derived by the NAM for each location.

It should be noted that the conditional probability calculation comprises the coverage of each sensor node 110. By the end of this step 202, the conditional probability is estimated for all the locations except the initial location, based on which the calculation has been performed. The Bayesian method may be used to compute the conditional probability. The conditional probability is calculated using the following equation:

$$P\left(\frac{A}{B}\right) = \frac{P(A \text{ and } B)}{P(B)} = \frac{\text{Probability of the occurence of both } A \text{ and } B}{\text{Probability of } B}$$

where B is the location where the first sensor node 110 is placed, i.e. the first non-zero in the x vector, and A is all other sensor nodes 110 which are taken one at time. The location for which the conditional probability is higher than the remaining calculated conditional probabilities is considered. If the location matches exactly with the location of non-zero in the vector x, then the mathematical determined location given by the previous step 201 is correct. If not, it may be necessary to re-compute the weights used to merge in the previous steps 201 and 202 to get a sufficiently accurate answer. A similar procedure is used for all the remaining non-zeros in x. More details about this step are illustrated in examples described below.

If the graphical output of the step 202 does not match with the mathematical output from step 201, then steps 201 and 202 are repeated for different values of above said parameters to obtain a different solution.

As a summary, the embodiments herein aim at finding the optimal number of sensor nodes 110 to monitor a given location along with their optimal locations. The method uses both a graph based approach as well as a mathematical optimization approach to estimate location of sensor nodes 110. Another perspective of the embodiments herein may be viewed as obtaining a lower dimensional approximation of the given sensor measurements. In moving to a lower dimension of sensor nodes 110, some error in the data may be introduced. At the same time, the cost of installing and purchasing the sensor nodes 110 is reduced. It may be an advantage if the error in the data is not more than the cost of installation of the sensor node 110. The number of sensor nodes 110 to be deployed may depend on the criticality of the application. The criticality is associated with the accuracy needed for the application. For critical applications, more accuracy is required, whereas for general applications, lower accuracy is enough. If the sensor number selection is for critical high safety or security applications, it may be affordable to compromise on the cost but not on the quality of the sensor information, hence more sensor nodes 110 may be preferred. On the other hand, for IoT based applications it may be possible to reduce the installation cost as the major requirement, thereby a little error in the data is acceptable if it is within the tolerance limitations. This scenario will now be described using an example where a sensor node 110 is exemplified with a temperature sensor as the sensor node 110.

Suppose there is a big conference room with three air conditioner devices installed. First the room is divided into a 20×20 grid to obtain 400 location points to monitor the temperature in the whole room. The temperatures are fed into a controller where the control actions are computed and fed into the air conditioner devices to adjust the temperature as per user's specification. Step 201 of FIG. 1 may be used to determine the minimum number of sensor nodes 110, i.e. the minimum number of temperature sensors, and the result in this example is to place one sensor node 110 being a temperature sensor and interpolate the remaining values. In doing so, a 30% approximation error is made. To translate in terms of cost, 15 US dollars loss is incurred compared to placing of three sensor nodes 110 at all three air conditioners. However, each temperature sensor 110 along with the wireless module costs around 20 US dollars and three such temperature sensors 110 cost around 50 US dollars. However, with only one temperature sensor 110, the cost of 30 US dollars may be incurred. Reducing the large number of temperature sensors 100 will increase the savings, at the same time as no data or performance loss takes place which introduces good business value in when implemented.

As explained earlier, the procedure is repeated for every sensor node 110, and a graph with all the different sensor nodes located 110 at different points of the grid are generated.

Figure 3:
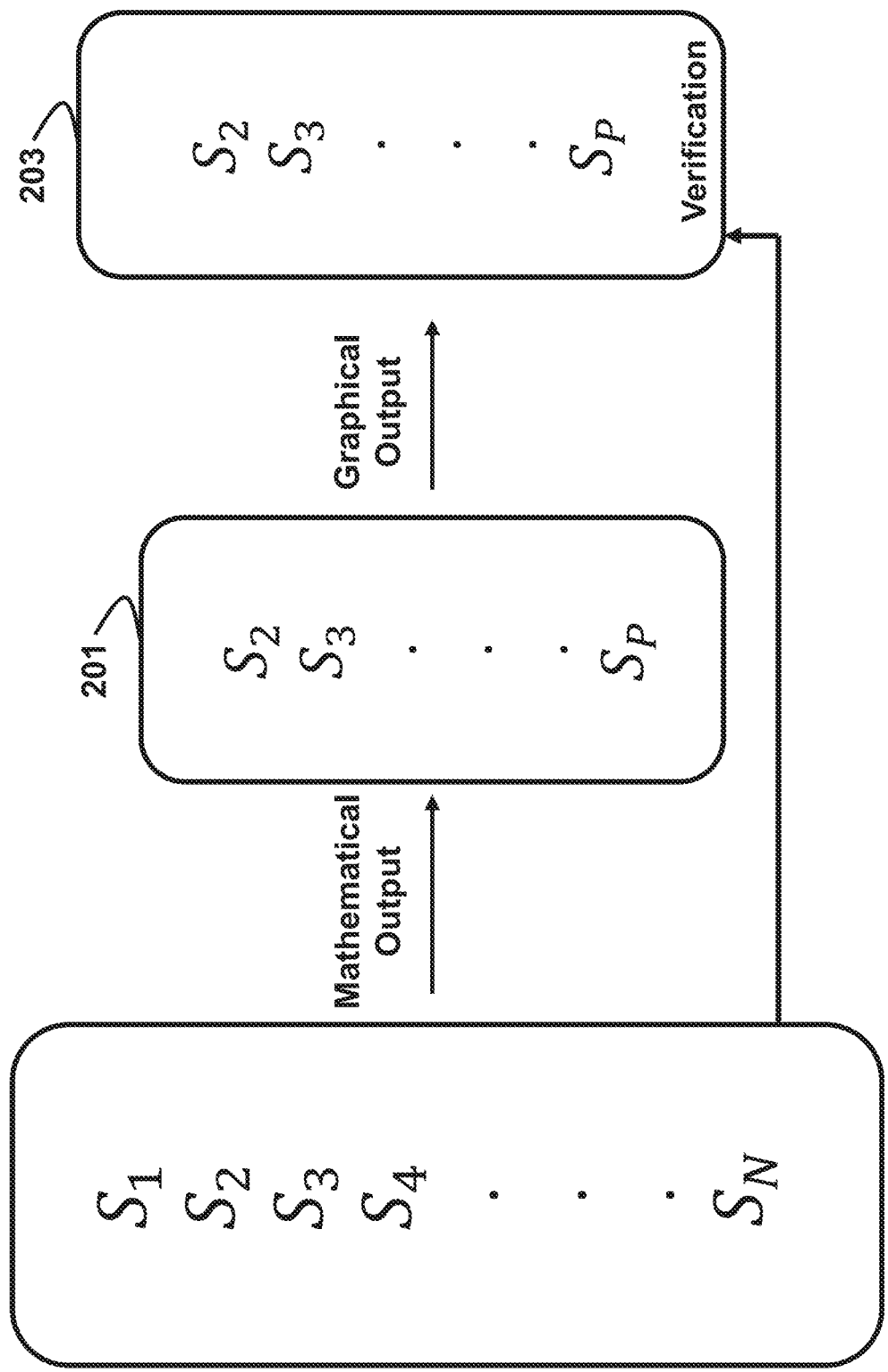
FIG. 3 is a flow chart illustrating an example method.

FIG. 3 is a graphical representation of the sensor nodes 110 and their locations. In FIG. 3, the left most box represents the sensor nodes 110 available at all the N locations. Using a set theory framework, this may be assumed to be a set of length N, where $S=\{S_1, S_2, \ldots, S_N\}$ and where S represents a sensor node 110. With available measurement data from all sensor nodes 110, the minimum number of sensor nodes 110, P (P≤N) is determined to represent the entire system. The mathematical algorithm proposed in step 201 determines the P value and also the best subset of the sensor nodes 110 of length P. Since, this subset is determined mathematically, there may be some mismatch with the real time implementation. Hence, to compensate this, a graph based method is used to validate the results. If the graphical result does not match with the mathematical result, then the mathematical output is re-commuted with different measurement data to obtain another solution. This process is repeated until the mathematical result matches with the graph based result.

Above, the minimum number of sensor nodes 110 and their optimal location are discussed, i.e. steps 201-203 in FIG. 2. Now, the minimum number of fog nodes 105 and their respective optimal location will be discussed, i.e. steps 204-205 in FIG. 2. Finding and optimal placing of the fog nodes 105 may be done to avoid front haul load and delay and introduce optimal communication between sensor and/or fog nodes 110, 103.

From the steps 200-203, multiple graphs for every different type of sensor node 110 was obtained. Next, all the obtained graphs may be obtained to obtain single graph with all the sensor nodes 110 embedded in it. For example, assume a matrix A divided into a 4×4 grid i.e. 16 locations where the sensor nodes 110 may be placed. Assume that there are two different types of sensor nodes 110 i.e. temperature sensor (T) and pressure sensor (P). Also assume from the previous steps 200-203 that the temperature sensor locations are obtained as in Table 1:

TABLE 1

| T |   |   | T |
|---|---|---|---|
|   |   | T |   |
|   |   |   | T |

Also assume that the pressure sensor locations are obtained as in Table 2;

TABLE 2

| P |   |   |   |
|---|---|---|---|
|   |   | P | P |

Merging these two graphs from Table 1 and Table 2 gives the locations of these sensor nodes 110 as seen in Table 3:

TABLE 3

| T, P |      |   | T |
|------|------|---|---|
|      | T, P |   | P |
|      |      |   | T |

From the graph in Table 3, the locations where sensor nodes 110 are to be placed may be obtained. As seen from the graph in Table 3, some locations comprise multiple sensor nodes 110 and some locations comprise only one sensor nodes 110. Assume that a vector which comprises the number of sensor nodes 110 available at every location is constructed. For the location graph in Table 3, the vector x may be as follows:

$x=[2000002000001011]$

Coming to the fog node placement, the graph based approach discussed in the previous case study may be used to also place fog nodes 105. For this the following optimization problem is solved:

$$\min_{a_j} \sum_{j=1}^{m} |a_j| \text{ subject to } \left\{ \sum_{k=j-1}^{j+1} \sum_{p=j-1}^{j+1} x_k x_p < \text{capacity of } (a_j), \forall j = 1, \ldots, M \right.$$

where M is the number of locations to be monitored and $a_j$ is the locations where the fog nodes 105 are to be placed. The objective function $|a_j|$ ensures that the location of the fog node 105 is sparse i.e. the minimum number of fog nodes 105 to be placed is obtained and the constrain $\sum_{k=j-1}^{j+1} \sum_{p=j-1}^{j+1} x_j$ measures the number of sensor nodes 110 placed around the location $a_j$ should be less than the capacity of the fog node 105 which establishes load balancing which is better than an expected level.

For example, assume that there is fog node 105 which may take utmost three sensor node connections and that the range of the fog node 105 is 1 m which is same as the length of the grid in the location. In this case, the optimization problem may be written as $$\min_{a_j} \sum_{j=1}^{16} |a_j| \text{subject to} \left\{ \sum_{k=j-1}^{j+1} \sum_{p=j-1}^{j+1} x_k x_p \leq 3, \forall j = 1, \ldots, 16 \right.$$

In this case, the combined graph for both sensor types may be as seen in Table 4:

TABLE 4

| T, P |      | F | T |
|------|------|---|---|
| F    |      | F |   |
|      | T, P | F | P |
|      |      |   | T |

Here there is a need of four fog nodes 105 in the network to obtain the seven temperature readings and wirelessly translate them to establish an optimal fog catching. Fog catching is a synonym for fog network. On the other hand, a general requirement of a single fog node 105 for each sensor node 110 results in seven fog nodes 105. This resulted in too much bandwidth usage and results in more cost from the customer side.

In the embodiments herein, the fog node coverage area is assumed and passed as input to the embodiments herein. By this, it may be ensured that the fog nodes 105 may result in low-latency as the distance to transfer the sensor measurements between the fog nodes 103 and sensor nodes 110 is less and it may result in low-latency applications.

The embodiments herein will now be described using two examples. Example 1 is related to buoy data and example 2 is related to weather sensors. Starting with example 1 where the sensor node 110 is exemplified with buoy comprising a temperature sensor, and reference number 110 is used when referring to the buoy in the following example.

A cluster of 23 buoys were selected and their data for the past 1 year sampled every hour was retrieved and stored. The dataset schema may be as follows:

*Timestamp*

*Buoy* 1

*Buoy* 2

*Buoy* 3

⋮

*Buoy* 23

The retrieved and stored data comprised 7270 instances across 23 buoys.

The air temperature measured by each of the buoys 110 was considered. Each buoy 110 is placed at a 2 km distance.

PCA and sparse optimization is used to tackle this problem. First, PCA was applied on the given data. From the PCA, it was found that 6 principal components represented 90% of the data.

$U, \text{Sigma}, VT = SV D(\text{data})$

Where data is a 7270×23 matrix which represents the readings across all buoys sampled at fixed intervals.
U is a 7270×7270 matrix
Sigma is a 23×23 diagonal matrix
VT is a 23×23 matrix Here 7270 refers to the number of timestamped instances when the readings of the sensor nodes 110 were noted, 23 refers to the number of sensor nodes 110 being considered across which information is gathered.

0 Eigen values were considered in the sigma matrix and the corresponding Eigen vectors from VT are obtained and used to generate relations between the various sensor nodes 110. The matrices Y, A and X may be defined as follows Y: 23×7270 matrix which is a transpose of data matrix.
A: 23×23 matrix which is used to describe the various dependencies between a given sensor node 110 and the other sensor node 110 in the network. Initially it may be an identity matrix.
X: 23×7270 matrix for which a sparse solution using A and Y may be estimated.

Each column in Y represents the values measured across all sensor nodes 110 at a given instance. Each column in A represents a sparse vector i.e. an optimal set of sensor nodes 110. A non-zero value at a particular index of the vector implies that a sensor node 110 must be present while a zero value indicates that the said sensor node 110 is not being considered. The A matrix is constructed based on the structure of X.

Sparse X may be estimated using either Lasso regression or Orthogonal Matching Pursuit using A and Y. The number of non-zeros required may be defined as the value k. A vector Z may be defined as the column wise sum of X of dimensions m×1. The top k values may be assigned as '1' and the rest as '0'. Z acts as a reference vector.

The construction of A will now be described. A may be constructed based on the reference vector Z. For all indices i such that Z[i] is non-zero, the corresponding A is as follows A[i,j]=1. For the zero indices in Z the corresponding column in A is set as 0, i.e. A[:,i]=0. If j is to represent set of non-zero indices in, the corresponding columns in A[:,j] is defined using N, N1 and N2 which may be derived from PCA.

The generation of N, N1 and N2 will now be described. If y were to represent the set of indices along the diagonal of the Sigma matrix having 0 Eigen value, the above may be calculated as follows $N = VT[:,y].$ Create N taking transpose of the 0 Eigen value columns of VT i.e. [:,y]

N1=all the columns of N whose indices in Z has value 0.
N2=all the columns of N whose indices in Z has a non-zero value.

Compute=−pinv(N1)×N2, the values of A are computed using B.

The optimization problem will now be described. Once the A matrix is constructed, the following optimization problem is solved to obtain minimum number of buoys along with the optimal number of locations.

The first term in an objective function ensures the estimated approximation error to be as small as possible, the second term ensures to obtain sparse X i.e. it comprises as many zeros as possible. The constraints ensure that the either value may be interpreted by other sensor nodes 110, in the case of sensor nodes 110.

As previously mentioned, the vector X comprises a plurality of zeros and non-zeros. The indices of non-zero elements correspond to the locations where the sensor nodes 110 are placed and number of non-zero elements represents number of sensor nodes 110 to be placed.

The computing norm will now be described. Yhat may be estimated as a matrix multiplication of A and:

$Y \text{ hat} = A \times X$

The norm is computed as $$Norm = \frac{\|Y - Y\,hat\|_2}{\|Y\|_2}$$

The equation Y hat=A×X may be iteratively repeated for different number of non-zeros thus estimating different sparse X. A decreasing value of norm may be expected as the number of non-zeros is increased. This is illustrated in FIG. 4, where the x-axis represents components, i.e. the size of the vector y, and the −axis represents the norm.

Hence it is observed that as the number of non-zeros is increased, i.e. the sparsity of X is reduced and the computed value of Norm i.e. the error between the actual output and estimated values reduces. The following may be seen from FIG. 4:

For 6 non-zeros: Norm=12.3
For 12 non-zeros: Norm=0.51
For 18 non-zeros: Norm=0.36

Figure 4:
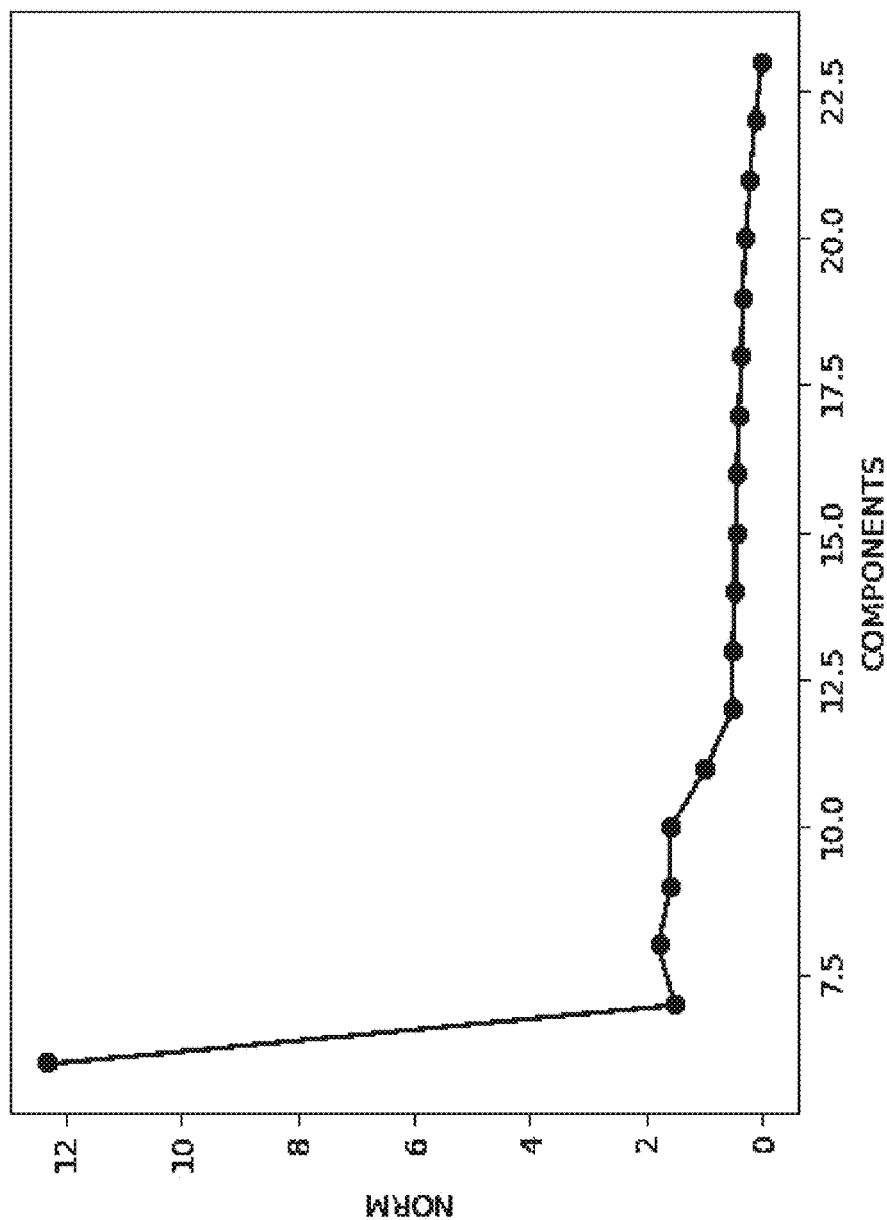
FIG. 4 is a graph illustrating norm.

Further values from the plot in FIG. 4 may also be extracted.

Next, the graph based approach may be used to verify the optimal locations for buoy installation. For this, step 205 in FIG. 2 may be used to construct the graph and the conditional probability. Deep NAM architecture may be used to calculate the association, i.e. the conditional probability values. The neural network architecture may be assumed to comprise two fully connected layers. The entire NAM structure is approximated in terms of a logistic function, which is used in construction of a loss function. The logistic function is tuned such that the loss function is minimized. The logistic function is evaluated at the current instance and it calculates conditional probability.

First, the conditional probability of placing a buoy, i.e. a fog node 105, at other locations is computed assuming there is already a buoy, i.e. a fog node 105, is at location 1. The estimated probability values are exemplified in vector C:

$$C = \begin{bmatrix} 0.0692701 & -0.0175876 & 0.1298785 & 0.0236012 & -0.1120909 & -0.0159294 \\ -0.0324568 & -0.1361236 & -0.0463462 & 0.020647 & 0.8378495 & 0.1492551 \\ -0.0247848 & -0.0805906 & 0.0191303 & -0.0232523 & -0.0130689 & 0.0287016 \\ 0.0033734 & -0.1229088 & -0.0571271 & 0.1489602 & 0.0120826 & 0.0120826 \end{bmatrix}$$

From the values in C, it is evident that the $11^{th}$ location probability is higher and hence, it may be concluded that there is a necessity of placing a second fog node 105 at the $11^{th}$ location after placing a first fog node 105 at $1^{st}$ location. This probability values agrees with the mathematical values obtained from step 205 of the method in FIG. 2. Next, the same process of calculating conditional probability is repeated assuming that a fog node 105 is placed at location 11. This process is repeated until all the fog nodes 105 are placed.

From the plot in FIG. 4, it may be inferred that instead of 23 fog nodes 105, only 8 fog nodes 105 needs to be required, and this results in 20% error while reconstructing the data. The optimal locations to place the fog nodes 105 may be 1, 5, 6, 11, 16, 19, 21, 22.

Then, step 205 of the method in FIG. 2 is used to compute the optimal locations to place the fog nodes 105. As required, it is assumed that the maximum number of sensor nodes 110 to be monitored by a single fog node 105 is 3 and that the maximum fog node coverage is 4 km. In this case, the optimal number of fog nodes 105 to monitor the location is 5 and the fog locations are also computed. The below Table 5 shows an example of the optimal locations to place fog nodes 105:

TABLE 5

| Fog node 105 | Location |
| --- | --- |
| 1 | Buoy 3 |
| 2 | Buoy 13 |
| 3 | Buoy 16 |
| 4 | Buoy 17 |
| 5 | Buoy 21 |

The locations exemplified in Table 5 are the locations where fog nodes 105 should be placed to monitor the all locations.

As discussed earlier, in moving from higher dimensional to lower dimension, some errors may be made. In this case, it is observed that cumulative error obtained across all the locations is 8%, whereas the obtained savings are much more than this. The savings are in terms of maintenance of fog nodes 105 and sensor nodes 110 at each location.

The method described herein will be described using an example which comprises real time data with different types of sensor nodes 110. The following example relates to a minimum sensors placement in a smart city environment. The measurement data discussed here is real-time weather data of a city. It comprises 8 different types of sensor nodes 110 placed across different locations. The different types of sensor nodes 110 may be:

Temperature (T)
Wind direction (WD)
Relative humidity (RH)
Wind speed (WS)
Global radiation (GR)
Atmospheric pressure (AP)
Net radiation (NR)
Etc.

These sensor nodes 110 are placed at different locations across the city. The example dataset comprises 8 temperature sensor readings, 8 wind direction sensors readings, 6 relative humidity sensor readings, 5 wind speed sensor readings, 5 global radiation sensor readings, 3 pressure sensors readings and 3 net radiation sensor readings. To use the proposed method, the area may be divided into a 3×3 grid which comprises 9 locations. Each location corresponds to a square box of 3 km×3 km. This is done because the maximum number of sensor nodes 110 of a single type is 8. Further, the information is interpolated across this 3×3 grid for different types of sensor nodes 110 to generate data for all the locations.

TABLE 6

| Locations used in the example | | |
| --- | --- | --- |
| 1 | 2 | 3 |
| 4 | 5 | 6 |
| 7 | 8 | 9 |

Subsequently, the method described herein is used to optimally place the different types of sensor nodes 110. First, the mathematical optimization is used to compute the minimum number of sensor nodes 110 along with their locations. Subsequently, this information is verified using the graph based approach.

For every type of sensor node 110, the optimal locations may be obtained as follows:

{'Atmospheric Pressure': array([4]),
'Global Radiation': array([8]),
'Net Radiation': array([8]),
'Relative Humidity': array([8, 4]),
'Temperature': array([4, 2, 6]),
'Wind Direction': array([4, 6, 3, 9]),
'Wind Speed': array([4, 3, 1, 2, 6])}

It should be noted that, different number of sensor nodes 110 are needed for different types of sensor nodes 110.

Figure 5:
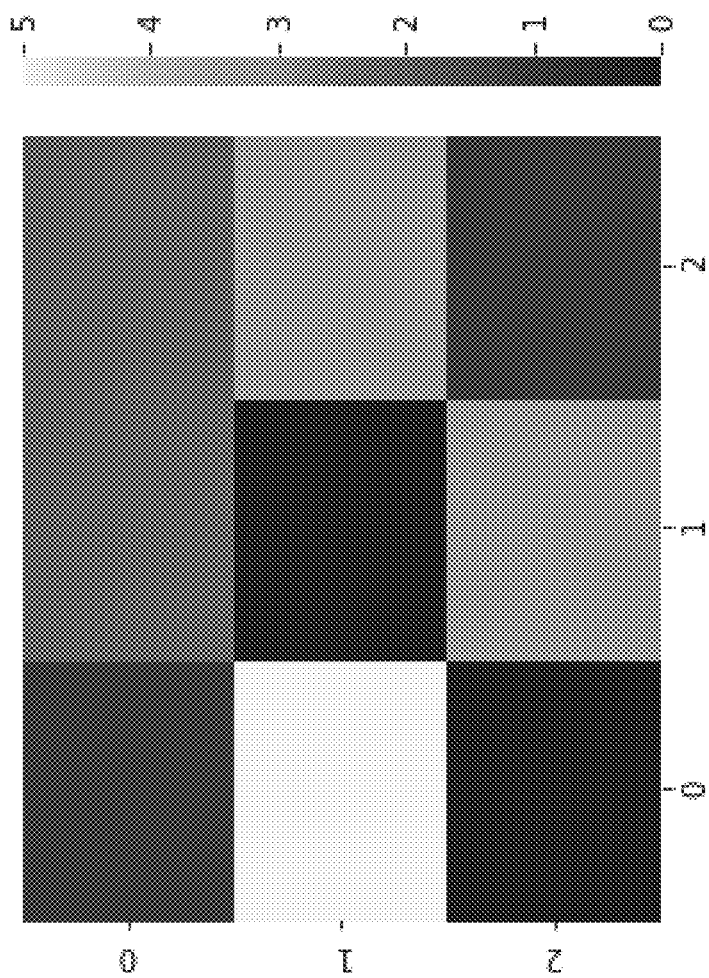
FIG. 5 is a graph illustrating a heat map of the locations with different number of sensor nodes.

Although this is the output of the optimization problem, the result agrees with the physics of the process, as atmospheric pressure variation will be less when compared with wind speed. Hence, a smaller number of sensor nodes 110 is needed for atmospheric pressure, whereas a larger number of sensor nodes 110 is needed for wind speed. An example of a heat map of the number of sensor nodes 110 in the location grid is shown in FIG. 5.

Finally, the optimal locations to place the fog nodes 105 are determined using step 205 of FIG. 2. The output of step 205 is exemplified in Table 7:

TABLE 7

| WS | T, WS | WD, WS |
|---|---|---|
| AP, RH, T, WD, WS | Fog node 1 | T, WD, WS, Fog node 3 |
| Fog node 2 | GR, NR, RH | WD, Fog node 4 |

Two input arguments may be used in deriving the fog node locations: (i) maximum number of sensor nodes 110 to be communicated with a single fog node 105 and (ii) the maximum area of coverage of each fog node 105. In this example, the maximum number of sensor nodes 110 to be communicated with a single fog node 105 is chosen to be 5 and the maximum coverage area is 6 km, i.e. a fog node 105 may monitor the sensor nodes 110 located in neighbouring grids.

The optimization problem resulted in a solution of 4 fog nodes 105 with the locations of fog nodes 105 as shown in Table 7. If the current method is used, it is required to place 7 fog nodes 105 at these locations to monitor the whole network. However, with the embodiments herein, it is shown that only 4 fog nodes 105 is sufficient to monitor the entire locations with these sensor nodes 110. This may be translated to huge savings of money as the maintenance costs associated with these fog nodes 105 are high. For a large location, for example with a size in the order of 100×1000, this may be translated to billion-dollar savings.

Figure 6:
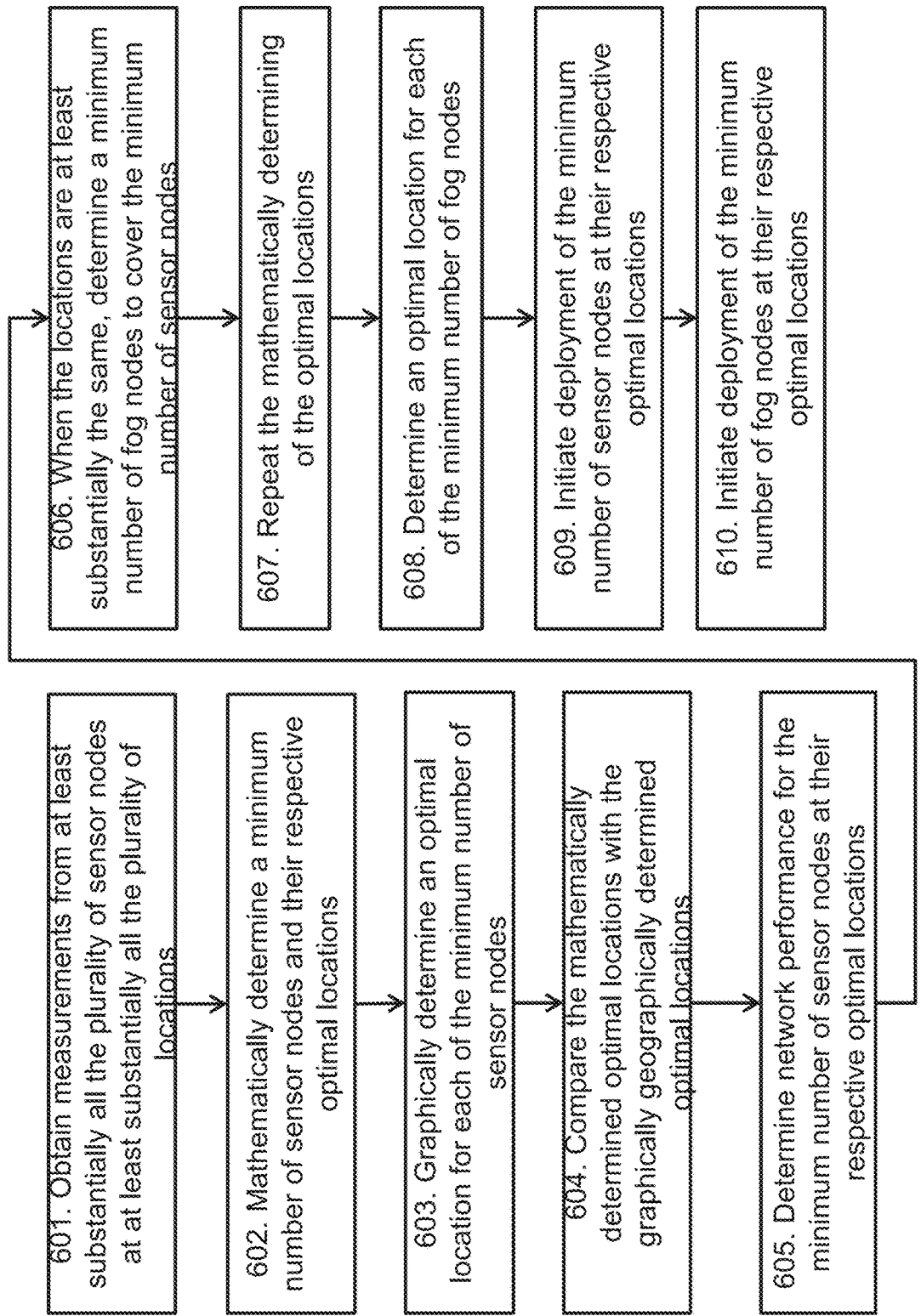
FIG. 6 is a flow chart illustrating an example method performed by a cloud node.

The method described above will now be described seen from the perspective of the cloud node 103. FIG. 6 is a flowchart describing the present method in the cloud node 103 for handling sensors nodes 110 and fog nodes 105 in a communications system 100. The communication system 100 comprises a plurality of sensor nodes 110 located at a plurality of locations to be handled by the fog nodes 105. The communication system 100 may be a 2G, 3G, 4G, 5G communication system or any other suitable communication system. The method comprises at least one of the following steps to be performed by the cloud node 103, which steps may be performed in any suitable order than described below:

Step 601

This step corresponds to step 200 in FIG. 2. The cloud node 103 obtains measurements from at least some or substantially all sensor nodes 110 at at least some or substantially all the plurality of locations. The measurements may also be referred to as sensor measurements, sensor data, sensor information, sensor reading etc. The term "substantially all" may comprise all nodes/locations, almost all nodes/locations, all nodes with the exception of a few nodes/locations.

Step 602

This step corresponds to step 201 in FIG. 2. Based on the obtained measurements, the cloud node 103 mathematically determines a minimum number of sensor nodes 110 and their respective optimal locations required to monitor the whole communication system 100.

The minimum number of sensor nodes 110 and their respective optimal locations may be mathematically determined using a sparse optimization technique. A sparse optimization technique may be described as a technique for obtaining a simple approximate sparser solution of an optimization problem, rather than a (more complex) exact solution. The sparse optimization may also be referred to as sparse approximation or sparse representation.

The minimum number of sensor nodes 110 may be a subset of the plurality of sensor nodes 110, i.e. it may be a smaller number of sensor nodes 110 than the plurality, or it may be the same number as the plurality of sensor nodes 110.

Each mathematically determined optimal location may be represented by a set of coordinates, e.g. x- and y-coordinates.

Mathematically determining may also be referred to as mathematically calculating, mathematically deriving etc. Mathematically determining may mean that equations are used in order to obtain the minimum number of sensor nodes 110 and their optimal locations.

Step 603

This step corresponds to step 202 in FIG. 2. Based on the obtained measurements and the mathematically determined optimal locations, the cloud node 103 graphically determines an optimal location for each of the minimum number of sensor nodes 110 required to monitor the whole communication system 100.

Each graphically determined optimal location may be represented by a set of coordinates, e.g. x- and y-coordinates.

The mathematically determined optimal locations and graphically determined optimal locations may be determined for each sensor node type when there is a plurality of sensor node types.

Graphically determining may comprise to obtain a graphical representation of the optimal locations. The graphical representation may be in the form of a table as shown above, a graph or any other suitable graphical representation. The graphical determining may be seen as different from the mathematically determining in the use of graphics and mathematic equations for taking the decision. Graphical obtained locations are x,y co-ordinates of the locations of the data. For example, the locations can be (2,1),(5,5). Similarly, mathematical determined locations are also x,y-co-ordinates of the locations of the data.

Step 604

This step corresponds to step 203 in FIG. 2. The cloud node 103 compares the mathematically determined optimal locations with the graphically determined optimal locations. The reason for comparing the locations is to determine whether or not they are substantially the same. If the compared locations are substantially the same, it may be concluded that the mathematically and graphically determinations have been done with sufficient accuracy and with sufficiently correct sensor measurements. If the locations are not substantially the same, i.e. they are different, it may be concluded that the mathematically obtained locations are not compiling to real-time conditions. Hence, the mathematical algorithm is re-run or repeated using different parameters in each repetition to obtain different sets of locations. This may be iterated until the mathematical locations and graphical locations are substantially same.

Step 605

This step corresponds to step 204 in FIG. 2. The cloud node may determine that the network performance for the minimum number of sensor nodes 110 at their respective optimal locations.

Step 606

This step corresponds to step 205 in FIG. 2. When the comparison indicates that the mathematically and graphically determined optimal locations are at least substantially the same, the cloud node 103 determines a minimum number of fog nodes 105 to cover the minimum number of sensor nodes 110.

Step 607

This step corresponds to step 201 in FIG. 2. When the comparison indicates that the mathematically and graphically determined optimal locations are not substantially the same, the cloud node 103 may repeat the mathematically determining of the optimal locations until they are determined to be substantially the same as the graphically determined optimal locations.

The repeated mathematically determining may be done based on different measurements than the previous mathematically determining. Thus, the first time that the optimal locations are mathematically and graphical determined is done based on a first measurement from substantially all sensor nodes 110. The second time, i.e. the repeated, the optimal locations are mathematically and graphically determined is done based on a second measurement form substantially all sensor nodes 110.

Step 608

This step corresponds to step 205 in FIG. 2. Based on the optimal location of sensor nodes 110, the cloud node 103 determines an optimal location for each of the minimum number of fog nodes 105.

The optimal location for each of the minimum number of fog node 105 may be determined based on the network performance from step 605.

The optimal location for each of the minimum number of fog nodes 105 may be determined to be such that the number of sensor nodes 110 within a range of each fog node 105 at the optimal location is less than a capacity of the fog node 110.

The minimum number of fog nodes 105 and their respective optimal locations may be determined using a linear programming technique. Linear programming is a mathematical modeling technique which may also be referred to as linear optimization. Linear programming is a technique for depicting complex relationships through linear functions and then finding the optimum points. Using other words, in linear programming a linear function is maximized or minimized when subjected to various constraints.

Step 609

The cloud node 103 may initiate deployment of the minimum number of sensor nodes 110 at their respective optimal locations.

Step 610

The cloud node 103 may initiate deployment of the minimum number of fog nodes 105 at their respective optimal locations.

Figure 7:
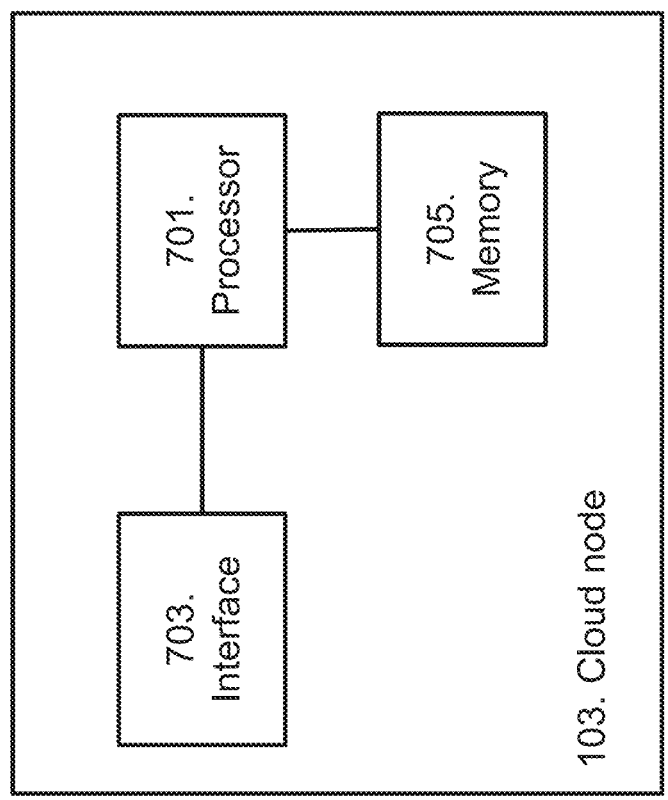
FIG. 7 is a schematic block diagram illustrating an example of a cloud node.

In FIG. 7, there is shown a cloud node 103 according to the embodiments herein. The cloud node 103 is comprised in a communications system 100, and the communication system 100 comprises a plurality of sensor nodes 110 located at a plurality of locations to be handled by fog nodes 105. The communication system 100 may be a 2G, 3G, 4G, 5G communication system or any other suitable communication system. The cloud node 103 comprises a processor 701, an interface 703 and a memory 705 in which memory instructions are stored for carrying out the method steps explained herein. The cloud node 103 communicates via the interface 703. The interface 703 comprises both an external interface, communicating with a transmitter and receiver, and internal interfaces (not shown).

The cloud node 103 is adapted to, e.g. by means of the processor 701, obtain measurements from at least some or substantially all the plurality of sensor nodes 110 at at least some or substantially all the plurality of locations.

The cloud node 103 is adapted to, e.g. by means of the processor 701, based on the obtained measurements, mathematically determine a minimum number of sensor nodes 110 and their respective optimal locations required to monitor the whole communication system 100.

The cloud node 103 is adapted to, e.g. by means of the processor 701, based on the obtained measurements and the mathematically determined optimal locations, graphically determine an optimal location for each of the minimum number of sensor nodes 110 required to monitor the whole communication system 100.

The cloud node 103 is adapted to, e.g. by means of the processor 701, compare the mathematically determined optimal locations with the graphically determined optimal locations.

The cloud node 103 is adapted to, e.g. by means of the processor 701, when the comparison indicates that the mathematically and graphically determined optimal locations are at least substantially the same, determine a minimum number of fog nodes 105 to cover the minimum number of sensor nodes 110.

The cloud node 103 is adapted to, e.g. by means of the processor 701, based on the optimal location of sensor nodes 110, determine an optimal location for each of the minimum number of fog nodes 105.

The cloud node 103 may be adapted to, e.g. by means of the processor 701, when the comparison indicates that the mathematically and graphically determined optimal locations are not substantially the same, repeat the mathematically determining of the optimal locations until they are determined to be substantially the same as the graphically determined optimal locations. The repeated mathematically determining may be done based on different measurements than the previous mathematically determining. Thus, the first time that the optimal locations are mathematically and graphical determined is done based on a first measurement from at least some or substantially all sensor nodes 110. The second time, i.e. the repeated, the optimal locations are mathematically and graphically determined is done based on a second measurement from at least some or substantially all sensor nodes 110.

The cloud node 103 may be adapted to, e.g. by means of the processor 701, determine network performance for the minimum number of sensor nodes 110 at their respective optimal locations. The optimal location for each of the minimum number of fog node 105 is determined based on the network performance.

The mathematically determined optimal locations and graphically determined optimal locations may be determined for each sensor node type when there is a plurality of sensor node types.

The optimal location for each of the minimum number of fog nodes 105 may be determined to be such that the number of sensor nodes 105 within the range of each fog node 105 at the optimal location is less than a capacity of the fog node 110.

The cloud node 103 may be adapted to, e.g. by means of the processor 701, initiate deployment of the minimum number of sensor nodes 110 at their respective optimal locations.

The cloud node 103 may be adapted to, e.g. by means of the processor 701, initiate deployment of the minimum number of fog nodes 105 at their respective optimal locations.

The minimum number of sensor nodes and their respective optimal locations may be mathematically determined using a sparse optimization technique.

The minimum number of fog nodes 105 and their respective optimal locations may be determined using a linear programming technique.

It is noted that the features of the methods described herein may be implemented in software and carried out on a data processing device or other processing means caused by the execution of program code means such as computer-executable instructions. Here and in the following, the term processing means comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof. For example, the program code means may be loaded in a memory, such as a RAM (Random Access Memory), from a storage medium, such as a read-only memory (ROM) or other non-volatile memory, such as flash memory, or from another device via a suitable data interface, the described features may be implemented by hardwired circuitry instead of software or in combination with software.

A computer program may comprise instructions which, when executed on at least one processor, cause the at least one processor to carry out the method steps 200-205 in FIG. 2 and steps 601-610 in FIG. 6. A carrier may comprise the computer program, and the carrier is one of an electronic signal, optical signal, radio signal or computer readable storage medium.

It should be noted that aspects of the embodiments herein may be utilized in connection with various services provided by a server or host computer to or from a user entity.

The embodiments herein enables exploration of communication system requirements such as avoid delay, Fog catching and low latency to establish fog computing, e.g. fog RAN usage, for any future 5G networking applications The embodiments herein for handling sensors nodes 110 and fog nodes 105) in a communications system 100 may be implemented through one or more processors, such as the processor 701 in the cloud node 103 depicted in FIG. 7 together with computer program code for performing the functions and actions of the embodiments herein. The program code mentioned above may also be provided as a computer program product, for instance in the form of a data carrier carrying computer program code for performing the embodiments herein when being loaded into the in the cloud node 103. One such carrier may be in the form of a CD ROM disc. It is however feasible with other data carriers such as a memory stick. The computer program code may furthermore be provided as pure program code on a server and downloaded to the cloud node 103.

The embodiments herein may be described as being divided into two stages or phases. The first stage relates to determining the minimum number of sensor nodes 110 and their optimal location. The first stage may be performed in three steps 1. Finding location details for minimal placement of sensor nodes 110.
2. Construct a graph to find the established communications on the placement.
3. Verify the performances measure of the minimal placement The second stage relates to determining the minimum number of fog nodes 105 and their respective optimal locations.

The embodiments herein are not limited to the above described embodiments. Various alternatives, modifications and equivalents may be used. Therefore, the above embodiments should not be taken as limiting the scope of the embodiments, which is defined by the appended claims. A feature from one embodiment may be combined with one or more features of any other embodiment.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "at least one of A and B" should be understood to mean "only A, only B, or both A and B.", where A and B are any parameter, number, indication used herein etc.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear in the claims.

The invention claimed is:

1. A method performed by a cloud node for handling sensors nodes and fog nodes in a communication system, wherein the communication system comprises a plurality of sensor nodes located at a plurality of locations to be handled by the fog nodes, the method comprising:
    obtaining measurements from at least some of the plurality of sensor nodes at at least some of the plurality of locations;
    based on the obtained measurements, mathematically determining a minimum number of sensor nodes and their respective optimal locations required to monitor the communication system;
    based on the obtained measurements and the mathematically determined optimal locations, graphically determining an optimal location for each of the minimum number of sensor nodes required to monitor the communication system;
    comparing the mathematically determined optimal locations with the graphically determined optimal locations;
    when the comparison indicates that the mathematically and graphically determined optimal locations are at least substantially the same, determining a minimum number of fog nodes to cover the minimum number of sensor nodes; and
    based on the mathematically determined optimal locations, determining an optimal location for each of the minimum number of fog nodes.

2. The method according to claim 1, further comprising, when the comparison indicates that the mathematically and graphically determined optimal locations are not substantially the same, repeating the mathematically determining of the optimal locations until they are determined to be substantially the same as the graphically determined optimal locations, wherein the repeated mathematically determining is done based on different measurements than the previous mathematically determining.

3. The method according to claim 1, further comprising:
determining network performance for the minimum number of sensor nodes at their respective optimal locations; and
wherein the optimal location for each of the minimum number of fog node is determined based on the network performance.

4. The method according to claim 1, wherein the mathematically determined optimal locations and graphically determined optimal locations are determined for each sensor node type when there is a plurality of sensor node types.

5. The method according to claim 1, wherein the optimal location for each of the minimum number of fog nodes is determined to be such that the number of sensor nodes within a range of each fog node at the optimal location is less than a capacity of the fog node.

6. The method according to claim 1, further comprising:
initiating deployment of the minimum number of sensor nodes at their respective optimal locations.

7. The method according to claim 1, further comprising:
initiating deployment of the minimum number of fog nodes at their respective optimal locations.

8. The method according to claim 1, wherein the minimum number of sensor nodes and their respective optimal locations are mathematically determined using a sparse optimization technique.

9. The method according to claim 1, wherein the minimum number of fog nodes and their respective optimal locations are determined using a linear programming technique.

10. A computer program product comprising a non-transitory medium including program code to be executed by a processor of a cloud node, whereby execution of the program code causes the cloud node to perform operations according to claim 1.

11. A cloud node in a communication system, wherein the communication system comprises a plurality of sensor nodes located at a plurality of locations to be handled by fog nodes, the cloud node comprising:
a processor; and
memory coupled with the processor, wherein the memory includes instructions that when executed by the processor causes the cloud node to perform operations comprising:
obtaining measurements from at least some of the plurality of sensor nodes at at least some of the plurality of locations;
based on the obtained measurements, mathematically determining a minimum number of sensor nodes and their respective optimal locations required to monitor the communication system;
based on the obtained measurements and the mathematically determined optimal locations, graphically determining an optimal location for each of the minimum number of sensor nodes required to monitor the communication system;
comparing the mathematically determined optimal locations with the graphically determined optimal locations;
when the comparison indicates that the mathematically and graphically determined optimal locations are at least substantially the same, determining a minimum number of fog nodes to cover the minimum number of sensor nodes; and
based on the mathematically determined optimal locations, determining an optimal location for each of the minimum number of fog nodes.

12. The cloud node according to claim 11, wherein the memory includes further instructions that when executed by the processor causes the cloud node to perform operations comprising:
when the comparison indicates that the mathematically and graphically determined optimal locations are not substantially the same, repeat the mathematically determining of the optimal locations until they are determined to be substantially the same as the graphically determined optimal locations, wherein the repeated mathematically determining is done based on different measurements than the previous mathematically determining.

13. The cloud node according to claim 11, wherein the memory includes further instructions that when executed by the processor causes the cloud node to perform operations comprising:
determine network performance for the minimum number of sensor nodes at their respective optimal locations; and
wherein the optimal location for each of the minimum number of fog node is determined based on the network performance.

14. The cloud node according to claim 11, wherein the mathematically determined optimal locations and graphically determined optimal locations are determined for each sensor node type when there is a plurality of sensor node types.

15. The cloud node according to claim 11, wherein the optimal location for each of the minimum number of fog nodes is determined to be such that the number of sensor nodes within the range of each fog node at the optimal location is less than a capacity of the fog node.

16. The cloud node according to claim 11, wherein the memory includes further instructions that when executed by the processor causes the cloud node to perform operations comprising:
initiate deployment of the minimum number of sensor nodes at their respective optimal locations.

17. The cloud node according to claim 11, wherein the memory includes further instructions that when executed by the processor causes the cloud node to perform operations comprising:
initiate deployment of the minimum number of fog nodes at their respective optimal locations.

18. The cloud node according to claim 11, wherein the minimum number of sensor nodes and their respective optimal locations are mathematically determined using a sparse optimization technique.

19. The cloud node according to claim 11, wherein the minimum number of fog nodes and their respective optimal locations are determined using a linear programming technique.

* * * * *